US007746522B2

(12) United States Patent
Oguri et al.

(10) Patent No.: US 7,746,522 B2
(45) Date of Patent: Jun. 29, 2010

(54) IMAGE READING DEVICE

(75) Inventors: Hirofumi Oguri, Nagoya (JP); Takashi Ohama, Iwakura (JP); Yoshinori Osakabe, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 974 days.

(21) Appl. No.: 11/511,521

(22) Filed: Aug. 29, 2006

(65) Prior Publication Data

US 2007/0047023 A1    Mar. 1, 2007

(30) Foreign Application Priority Data

Aug. 31, 2005    (JP) ............................... 2005-251052

(51) Int. Cl.
*H04N 1/04* (2006.01)

(52) U.S. Cl. ....................... 358/497; 358/474; 358/482; 358/483

(58) Field of Classification Search ................. 358/497, 358/494, 474, 483, 482, 505; 399/211; 250/208.1, 250/239, 234–236; 382/312, 318, 319
See application file for complete search history.

(56) References Cited

U.S. PATENT DOCUMENTS

| 5,610,731 | A  | * | 3/1997 | Itoh .......................... 358/496 |
| 7,180,641 | B2 | * | 2/2007 | Chang et al. ................. 358/497 |
| 7,253,930 | B2 | * | 8/2007 | Hendrix et al. ............. 358/474 |
| 7,502,146 | B2 | * | 3/2009 | Hanashi et al. ............. 358/483 |

FOREIGN PATENT DOCUMENTS

JP    8-228266    9/1996

* cited by examiner

*Primary Examiner*—Cheukfan Lee
(74) *Attorney, Agent, or Firm*—Banner & Witcoff, Ltd

(57) ABSTRACT

A scanner unit includes a housing having an opening on its upper surface, a platen glass provided so as to be exposed from the opening on the upper surface of the housing, a carriage provided in the housing so as to be movable parallel with the platen glass, a linear CIS mounted on the carriage in a direction perpendicular to the moving direction to read the image of a document placed on the platen glass, roller units provided in the vicinity of both ends and central part with respect to the vicinity of the both ends of the CIS in the longitudinal direction so as to abut on the platen glass, and a coil spring provided in the carriage so as to force the CIS toward the platen glass.

10 Claims, 10 Drawing Sheets

IMAGE READING DEVICE

CROSS-REFERENCE TO RELATED APPLICATIONS

This Nonprovisional application claims priority under 35 U.S.C. §119(a) on Patent Application No. 2005-251052 filed in Japan on Aug. 31. 2005, the entire contents of which are hereby incorporated by reference.

BACKGROUND

The present invention relates to an image reading device in which an image sensor mounted on a carriage is moved parallel to and immediately below a transparent board to read the image on a document placed on the transparent board.

Conventionally, an image reading device that performs an image reading for a still document has been well known. The image reading for the still document is performed by moving an image sensor reciprocally along a platen glass on which the document is placed. Such an image reading is known as an image reading device called a flatbed type.

FIG. 1 is a sectional view showing the inner constitution of a conventional image reading device. As shown in FIG. 1, a platen glass 91 is provided so as to be exposed on the upper surface of a housing 90. On the platen glass 91, a document to be read is placed. An image reading unit 92 is provided in the housing 90. The image reading unit 92 has an image sensor 93. The image sensor 93 is a contact image sensor (referred to as the "CIS" hereinafter), The image sensor 93 is mounted on a carriage 94. The carriage 94 is supported by a guide shaft 95 so as to be slid in the axial direction of the guide shaft 95. The carriage 94 is connected to a timing belt of a belt driving mechanism, for example. When the driving force is transmitted from the belt driving mechanism, the carriage 94 is slid in the predetermined direction (the above axial direction). In addition, the belt driving mechanism is omitted in FIG. 1.

Rollers 96 are provided at both ends of the image sensor 93 so as to be projected from the upper surface of the image sensor 93. In addition, a coil spring 97 is provided between the image sensor 93 and the carriage 94. The image sensor 93 is elastically forced toward the platen glass 91 by the coil spring 97 and the rollers 96 are pressed against the platen glass 91. When the carriage 94 is slid, the image sensor 93 mounted on the carriage 94 is also moved. The rollers 96 pressed against the platen glass 91 roll while the image sensor 93 is moved. The image sensor 93 applies light to the document placed on the platen glass 91 while being slid and outputs an electric signal according to its reflected light intensity. The image reading of the document is performed based on the electric signal.

The CIS used as the image sensor 93 has a small focal depth as compared with a reduced optical image reading unit using a CCD(Charge Coupled Device), for example. When the document is positioned out of the focal depth of the image sensor 93, the image sensor 93 cannot focus on the document. As a result the quality of the read image is inferior. Therefore, the distance between the upper surface of the image sensor 93 and the upper surface of the platen glass 91 on which a document is placed is desirably kept within a predetermined range based on the focal distance. According to the above image reading device, the distance from the upper surface of the image sensor 93 to the back surface of the platen glass 91 is set by the rollers 96 projected from the upper surface of the image sensor 93 and pressed against the platen glass 91, so that a desired and constant focal distance is maintained.

The platen glass 91 could be bent by external force. For example, when a book document is pressed against the platen glass 91 at the time of image reading, the weight of the book document and pressing force by a user are applied to the platen glass 91. Although the platen glass 91 is prevented from being bent by increasing its thickness, a demand for reduction in weight and cost cannot be implemented.

For example, when the center of the platen glass 91 is bent downward, the distance from the vicinity of the center to the upper surface of the image sensor 93 is shortened, so that it could deviate from the focal depth of the image sensor 93. As described above, according to the constitution in which the distance between the platen glass 91 and the image sensor 93 is kept constant by the rollers 96 provided at both ends of the image sensor 93, when the platen glass 91 is excessively bent downward, the platen glass 91 could be in contact with the vicinity of the center of the upper surface of the image sensor 93. Especially, when it comes in contact with the platen glass 91 while the image sensor 93 is moved, the image sensor 93 and the platen glass 91 could be damaged. In order to solve the above problem, it is proposed that a roller is further provided in the vicinity of the center of the image sensor 93 with a predetermined space from the platen glass 91. Thus, the bent platen glass 91 comes in contact with the roller at the center and it is prevented from being bent excessively (refer to Japanese Patent Application Laid-Open No. 8-228266 (1996)).

SUMMARY

The roller provided at the center of the image sensor 93 is arranged with the predetermined distance from the platen glass 91 so that the track of the roller may not be left on the platen glass 91 because of the contact. Thus, the roller is not in contact with the platen glass 91 that is not bent. Here, the CIS has a small focal depth as mentioned above. So, to keep the read image quality constant, a shift length in focal distance of the CIS is very small. To be specific, less than or equal 1 mm as the shift length is permissible. Therefore, the distance between the roller and the platen glass 91 is not more than 1 mm and it has to be set about 0.2 to 0.5 mm from a practical standpoint. However, in view of roller deformation and an assembling error, it is difficult to provide the roller at the center of the image sensor 93 so that the distance may be kept with such precision.

In addition, it is proposed that the distance between the upper surface of the image sensor 93 and the platen glass 91 set by the rollers 96 provided at both ends of the image sensor 93 is shifted upward from the focal distance, so that the bending amount of the platen glass 91 until it comes into contact with the roller provided at the center of the image sensor 93 is increased. Namely, the periphery of the bent platen glass 91 is shifted upward from the focal distance and the center thereof is shifted downward from the focal distance. Thus, the bent platen glass 91 is within a predetermined range in the vertical direction from the focal distance as a whole. However, when the platen glass 91 is not bent, the position of the document is shifted upward from the focal distance of the image sensor 93. When it is considered that the platen glass 91 is not frequently bent, it is not preferable that the image quality at the time of normal reading is lowered even if a predetermined read image quality is maintained.

In view of the above, it is an object to provide an image reading device in which a platen glass is prevented from being bent and an optimal read image quality can be kept constant.

It is another object to prevent that a contact of the platen glass with a member in an image reading region affects a read image quality.

An image reading device according to a first aspect is characterized by comprising a transparent board having a surface on which a document is placed; a carriage provided on the side of the back surface of the transparent board so as to be movable parallel with the transparent board; a linear image sensor mounted on the carriage in the direction perpendicular to the moving direction to perform an image reading operation for the document placed on the transparent board; a plurality of positioning members provided in the vicinity of both ends and central part with respect to the vicinity of the both ends, of the image sensor in the longitudinal direction, and projected so as to abut on the transparent board; and a forcing member provided in the carriage to force the image sensor toward the transparent board.

The document is placed on the transparent board. The image sensor scans the document to read its image. The image sensor is mounted on the carriage. The carriage can be moved parallel with the transparent board and the image sensor is moved parallel together with the carriage. The image sensor mounted on the carriage is forced toward the transparent board by the forcing member. In addition, the plurality of positioning members are provided in the image sensor and abut on the transparent board. The distance between the transparent board and the image sensor is kept constant with the positioning members.

The positioning members are arranged in the vicinity of both ends and central part with respect to the vicinity of the both ends of the image sensor. Here, the vicinity of both ends is positioned at both ends of the image sensor in the longitudinal direction outside the image reading region. Furthermore, the central part with respect to the vicinity of the both ends is a predetermined region including the center of the image sensor in the longitudinal direction and it is the image reading region of the image sensor in the broad sense. The positioning members provided at least three points in the vicinity of the both ends and the central part with respect to the vicinity of the both ends, of the image sensor in the longitudinal direction, abut on the transparent board, whereby the distance between the transparent board and the image sensor is kept constant. Since the transparent board is supported by the positioning member provided in the central part of the image sensor, even when the vicinity of the center of the transparent board is pressed at the time of placing of the document on the transparent board, the transparent board is not bent by that load.

When an excessive load is applied to the transparent board, the image sensor is moved toward the carriage against the force of the forcing member. That is, even when the transparent board is bent, the transparent board is not in contact with the image sensor directly. In addition, the excessive load is not directly applied to the image sensor.

According to the image reading device in the first aspect, since the plurality of positioning members for keeping the distance between the transparent board and the image sensor are arranged in the vicinity of the both ends and the central part with respect to the vicinity of the both ends of the image sensor in the longitudinal direction, when the positioning members abut on the transparent board at the three points in the vicinity of the both ends and the central part with respect to the vicinity of the both ends of the image sensor in the longitudinal direction at least, the distance between the transparent board and the image sensor can be kept constant, and the transparent board is supported by the positioning member arranged in the central part of the image sensor. Thus, even when the load is pressed against the central part of the image sensor, the transparent board is not bent by the load. As a result, the distance between the transparent board and the image sensor can be kept constant and the image reading can be implemented with high precision.

Furthermore, even when the transparent board is bent by the excessive load against the force of the forcing member, the transparent board is not in contact with the image sensor directly and the excessive load is not directly applied to the image sensor. As a result, the image sensor can be prevented from being damaged by the excessive load.

The above and further objects and features will more fully be apparent from the following detailed description with accompanying drawings.

DETAILED DESCRIPTION OF THE EXEMPLARY EMBODIMENTS

This embodiment will be described with reference to the drawings hereinafter.

Figure 1:
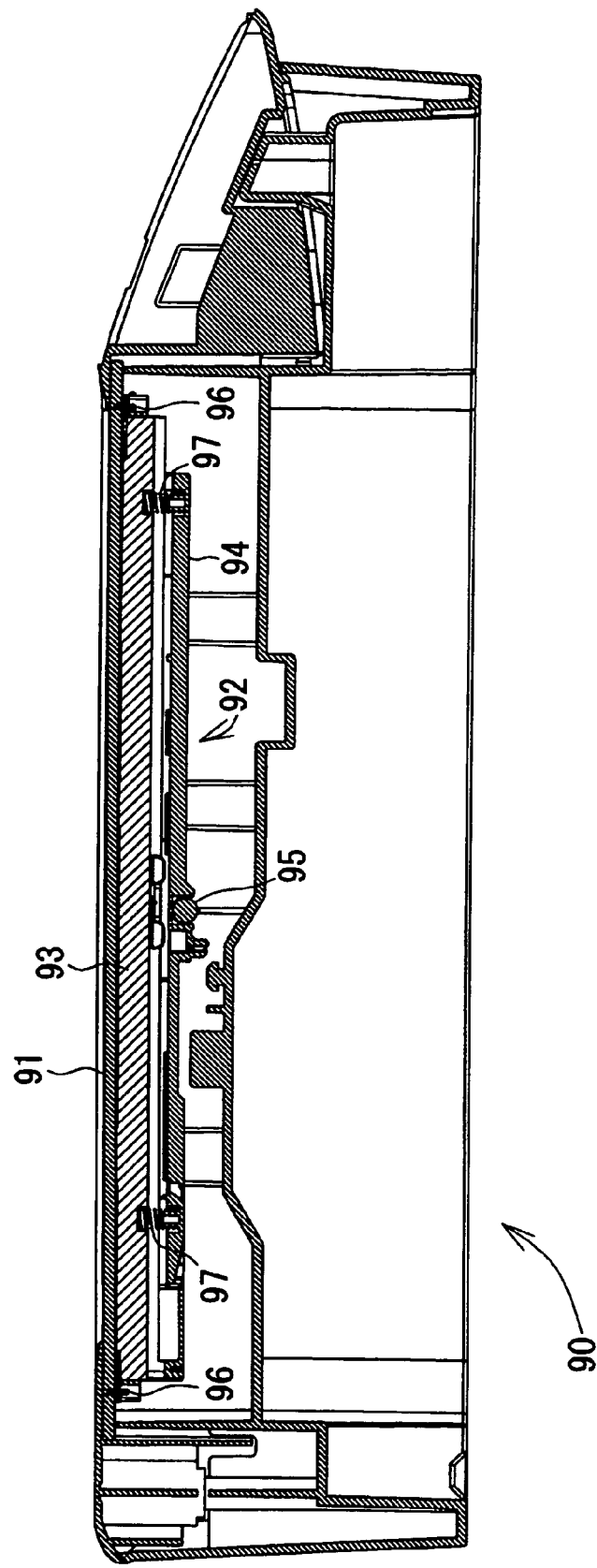
FIG. 1 is a sectional view showing the inner constitution of a conventional image reading device.
Figure 2:
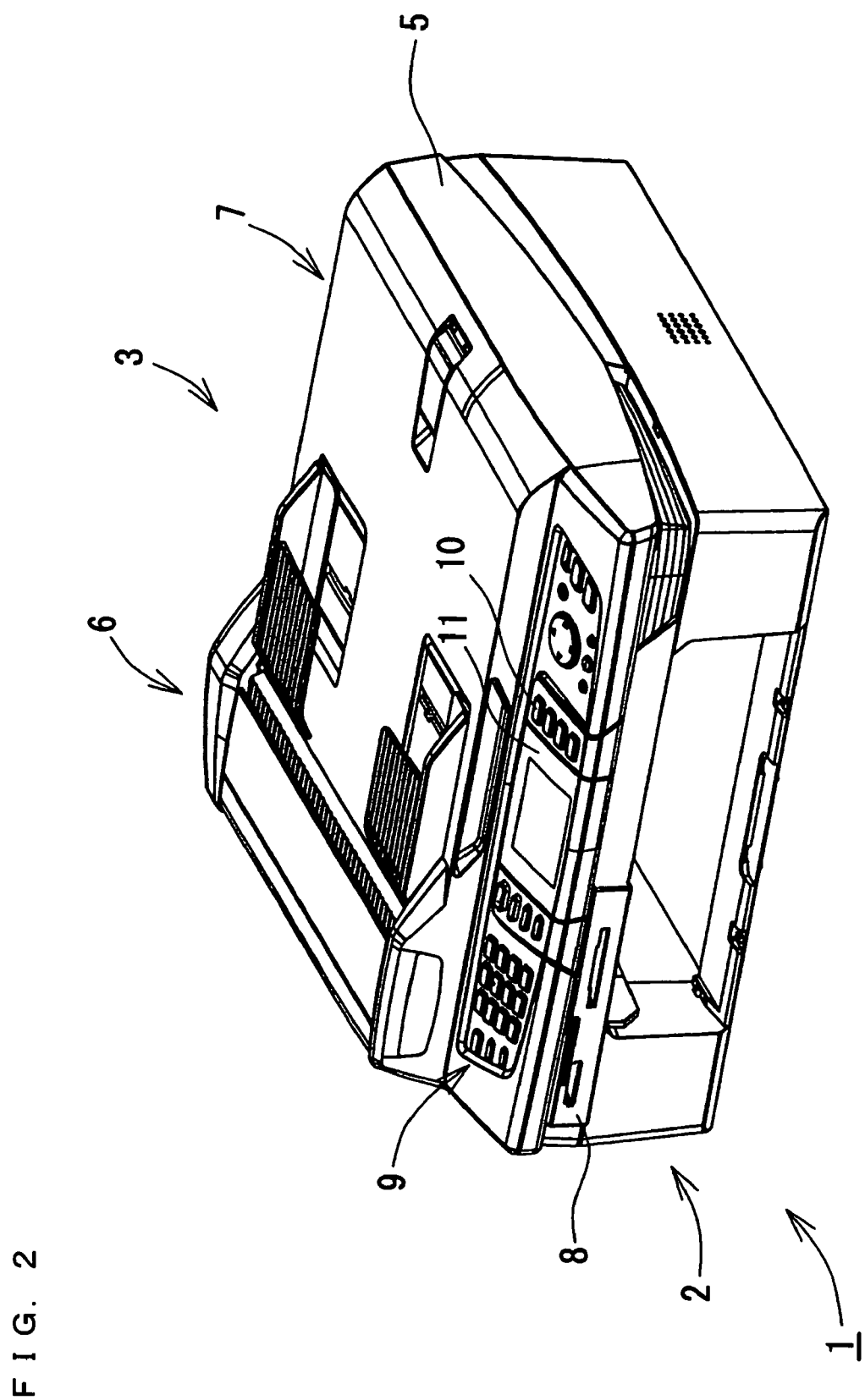
FIG. 2 is a perspective view showing the outer constitution of a multi function device 1 according to this embodiment.

FIG. 2 shows an outer constitution of a multi function device1 according to this embodiment. The multi function device (MFD) 1 integrally comprises a printer unit 2 at a lower part and a scanner unit 3 at an upper part and it has a printer function, a scanner function, a copy function and a facsimile function. An image reading device according to this embodiment is implemented as the scanner unit 3 of the multi function device 1. It is needless to say that the multi function device 1 is just an example, and the image reading device according to this embodiment can be implemented as an image reading unit for a scanner or a copying machine, for example.

The multi function device 1 is mainly connected to a computer (not shown) and image data read by the scanner unit 3 can be transferred to the computer. In addition, when various kinds of storage media, such as a memory card is connected to the multi function device 1, the image data read by the scanner unit 3 can be stored in the storage media. Furthermore, based on image data or document data transmitted from the computer, an image or a document can be recorded on a recording sheet by the printer unit 2. According to this embodiment, since the constitution other than the scanner unit 3 to implement the scanner function is not related directly, the description for the constitution of the printer unit 2 and the like will be omitted.

As shown in FIG. 2, an operation panel 9 is provided on the front side of the multi function device 1. The operation panel 9 comprises various kinds of operation keypads 10 and a liquid crystal display 11. A user inputs a desired command through the operation panel 9. The multi function device 1 receives a predetermined input and performs a predetermined operation for the input. The multi function device 1 also operates in response to a command transmitted from the computer connected to it through a printer driver or a scanner driver or the like other than the inputted command through the operation panel 9.

A slot 8 from which various kinds of compact memory cards serving as the storage media can be inserted is provided at the upper left portion of the front of the multi function device 1. The image data read by the scanner unit 3 can be stored in the compact memory card in the slot 8. In addition, the image data can be read from the compact memory card and displayed on the liquid crystal display-11. Furthermore, the arbitrary image data stored in the compact memory card can be printed out by the printer unit 2. The input for performing the above is inputted through the operation panel 9.

The constitution of the scanner unit 3 will be described in detail hereinafter.

Figure 3:
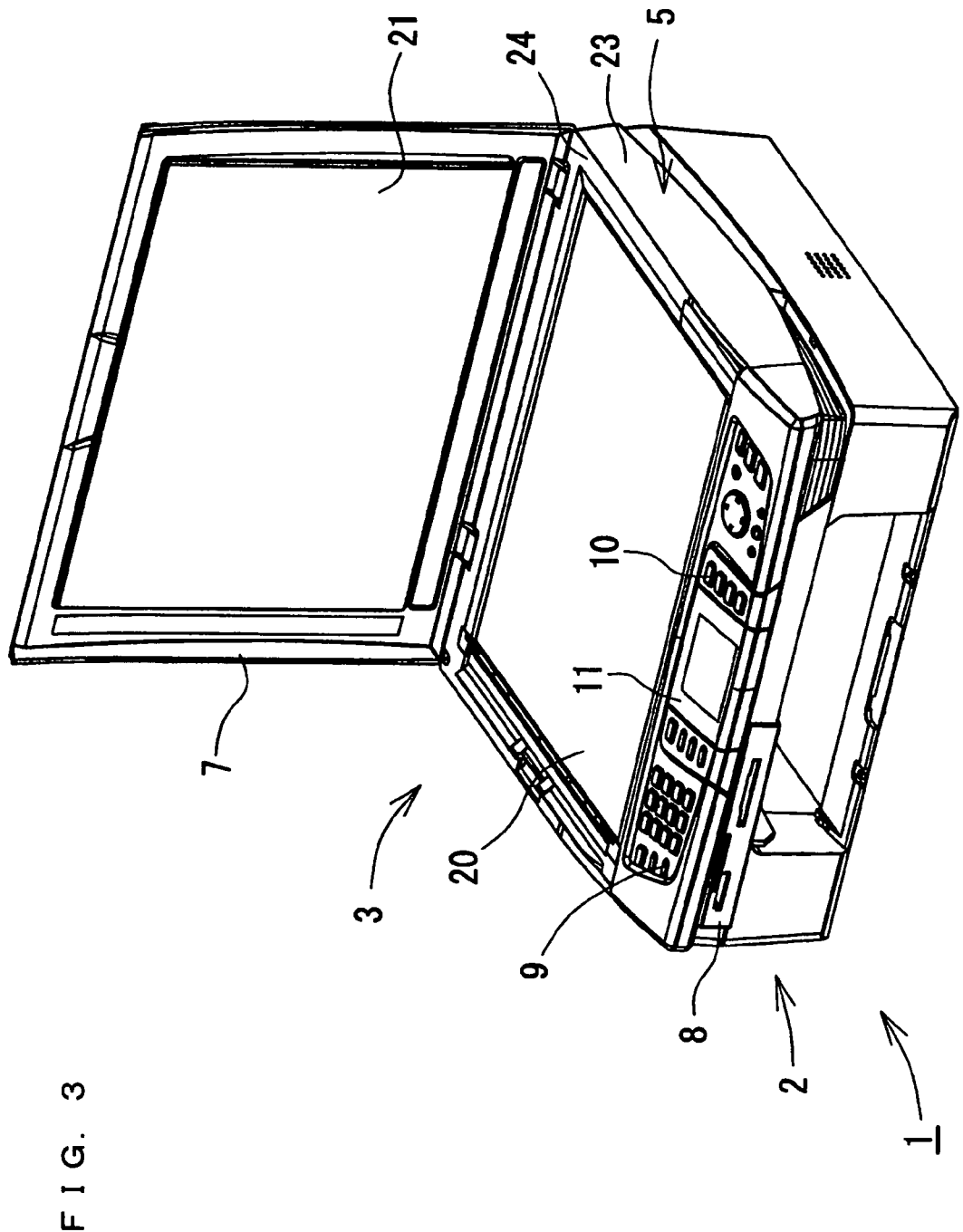
FIG. 3 is a perspective view showing the multi function device 1 when a document cover 7 is open.

As shown in FIGS. 2 and 3, the scanner unit 3 functioning as a FBS (Flatbed Scanner) comprises a housing 5 and a document cover 7 comprising an ADF (Auto Document Feeder: referred to as "ADF" hereinafter) that is mounted on the housing 5 through a hinge provided on the back side so as to be closed and opened. The housing 5 is a casing of the multi function device 1. The document cover 7 constitutes a part of the upper surface of the multi function device 1 in its closed state on the housing 5. In addition, since the structure and function of the ADF 6 is not directly related, the detailed description of the ADF 6 will be omitted.

FIG. 3 is a perspective view showing the multi function device 1 in which the document cover 7 is open. As shown in FIG. 3, a rectangular opening is formed on the upper surface of the housing 5, and a platen glass 20 (transparent board) is exposed in the opening. As shown in FIG. 2, when the document cover 7 is closed, the platen glass 20 is covered with the document cover 7. A press member 21 comprising a sponge or a white board etc. is provided on the lower surface of the document cover 7. A document is placed on the platen glass 20 when the scanner unit 3 is used as the FBS and it is a transparent glass board or an acrylic board, for example. A document of A3 (297 mm×420 mm) size or less can be placed on the platen glass 20 exposed on the upper surface of the housing 5. When the document of A3 size or less is placed on the platen glass 20 and the document cover 7 is closed, the document is fixedly held between the document cover 7 and the platen glass 20. In this state, when an image reading unit 22 that will be described below scans the document along the platen glass 20, the image of the document is read by the FBS. In addition, the platen glass 20 also constitutes a reading surface when the image is read by the ADF 6.

Figure 4:
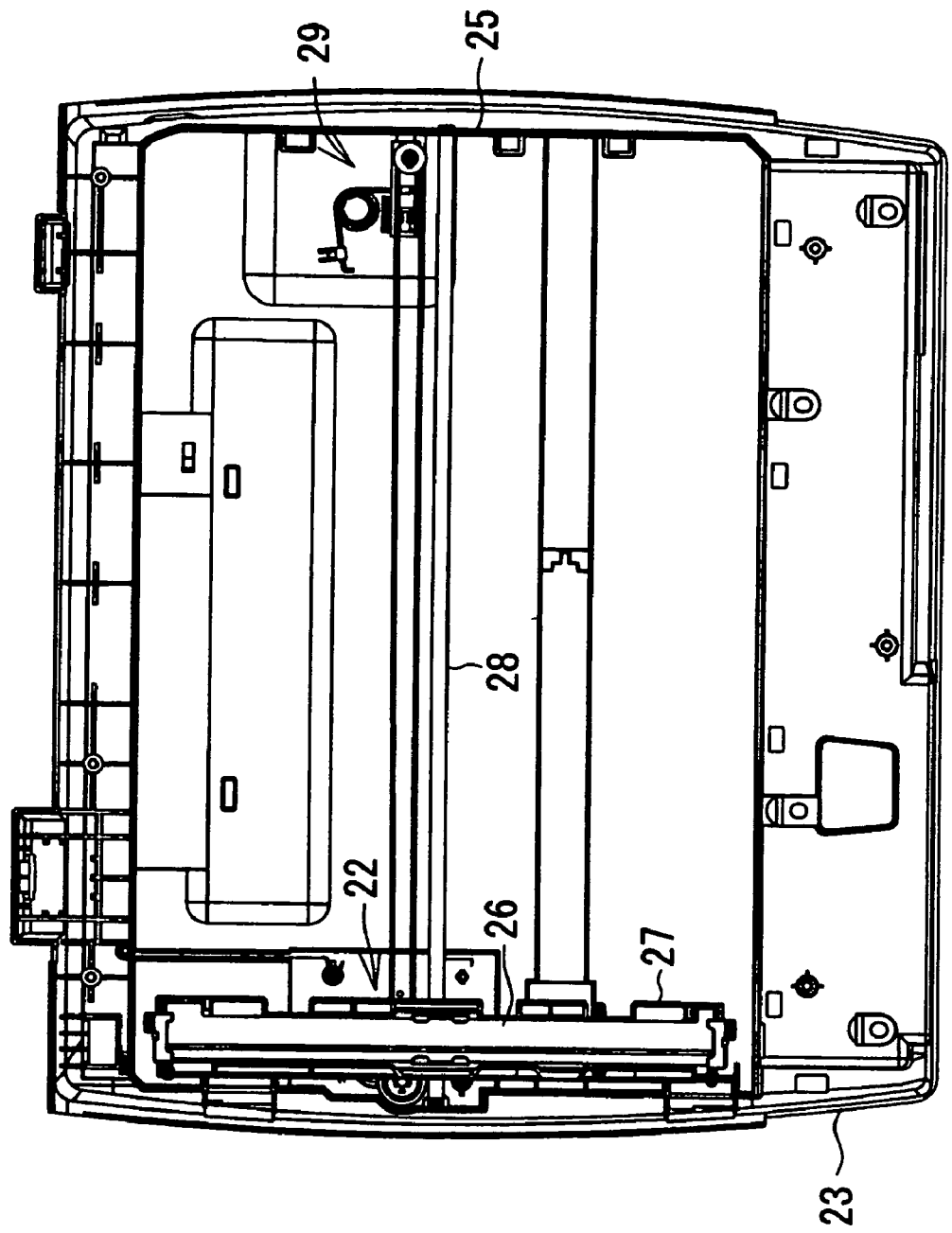
FIG. 4 is a plan view showing the inner constitution of a housing 5.

FIG. 4 is a plan view showing an inner structure of the housing 5. The image reading unit 22 is arranged in a lower frame 23 of the housing 5. When an upper cover 24 (refer to FIG. 3) in which the opening for exposing the platen glass 20 is formed in the center is fitted to the lower frame 23, the housing 5 is constituted. In addition, a supporting rib 25 for supporting the platen glass 20 is projected from a bottom surface of the lower frame 23 so as to surround a moving range of the image reading unit 22. The supporting rib 25 is positioned outside the opening of the upper cover 24. The platen glass 20 is horizontally supported by the supporting rib 25 on the periphery of the region exposed in the upper cover 24. In addition, although a boss to screw various kinds of members, a through hole for electric wiring and the like are provided in the lower frame 23, since these are appropriately designed according to the usage they are not shown here.

The image reading unit 22 comprises a contact image sensor (referred to as the "CIS" hereinafter) 26, a carriage 27, a guide shaft 28, and a belt driving mechanism 29. When the image reading unit 22 comprises the CIS 26, the image sensor can be compact in size and light in weight, so that the scanner unit 3 can be miniaturized and thinned.

Figure 5:
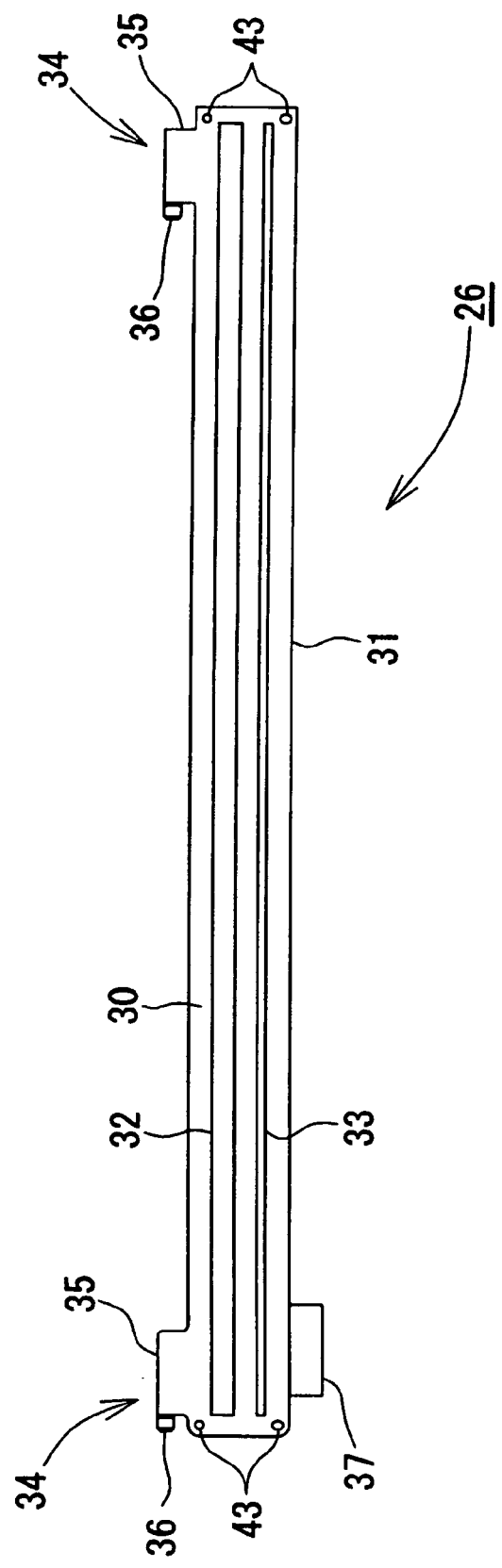
FIG. 5 is a plan view showing the constitution of a CIS 26.

FIG. 5 is a plan view showing the constitution of the CIS 26. As shown in FIG. 5, the CIS 26 comprises an elongated rectangular solid casing 31 having an upper surface 30 that is an elongated rectangular flat surface in plan view. A light guide 32 for guiding the light of a LED incorporated in the casing 31 is provided on the upper surface 30 of the casing 31 in the longitudinal direction of the casing 31. With the light guide 32, the light of the LED is emitted toward the upper surface 30 of the casing 31 of the CIS 26 along the longitudinal direction. In addition, a plurality of condenser lenses 33 are provided in a line on the upper surface 30 of the casing 31 in the longitudinal direction of the casing 31 so as to be parallel to the light guide 32.

A plurality of light receiving elements are arranged just under the condenser lenses 33 in the same direction as that of the condenser lenses 33 in the casing 31. The light emitted from the LED is applied to the document on the platen glass 20, and its reflective light is condensed by the condenser lenses 33 and received by the light receiving elements. The light receiving elements are photoelectric conversion elements that output electric signals according to intensity of the reflected light. The longitudinal direction of the casing 31 of the CIS 26 is a main scanning direction in image reading. The length of the main scanning direction, that is, the length of the casing 31 of the CIS 26 in the longitudinal direction is the length corresponding to a document of a maximum size that can be read by the CIS 26. The CIS 26 performs the image reading along the longitudinal direction of the casing 31 serving as a reading line, and outputs the electric signal every reading line. According to this embodiment, since the A3 size document can be placed on the platen glass 20, the reading line of the CIS 26 corresponds to the A3 size document.

A pair of engagement parts 34 are provided in the casing 31 of the CIS 26. The engagement parts 34 position the CIS 26 in a sub-scanning direction, that is, the direction crossing the main scanning direction at right angles with respect to the carriage 27. Each of the engagement parts 34 comprises a base 35 projected from one end of the casing 31 of the CIS 26 in the direction of the shorter side and a shaft 36 projected from the base 35 in the longitudinal direction. When the shaft 36 engages with a pedestal 40 of the carriage 27 that will be described below, the CIS 26 can be positioned in the sub-scanning direction. A projection 37 is projected at the other end of the casing 31 of the CIS 26 in the direction of the shorter side. When the projection 37 engages with a recess 41 of the carriage 27 that will be described below, the CIS 26 is positioned in the main scanning direction.

Figure 6:
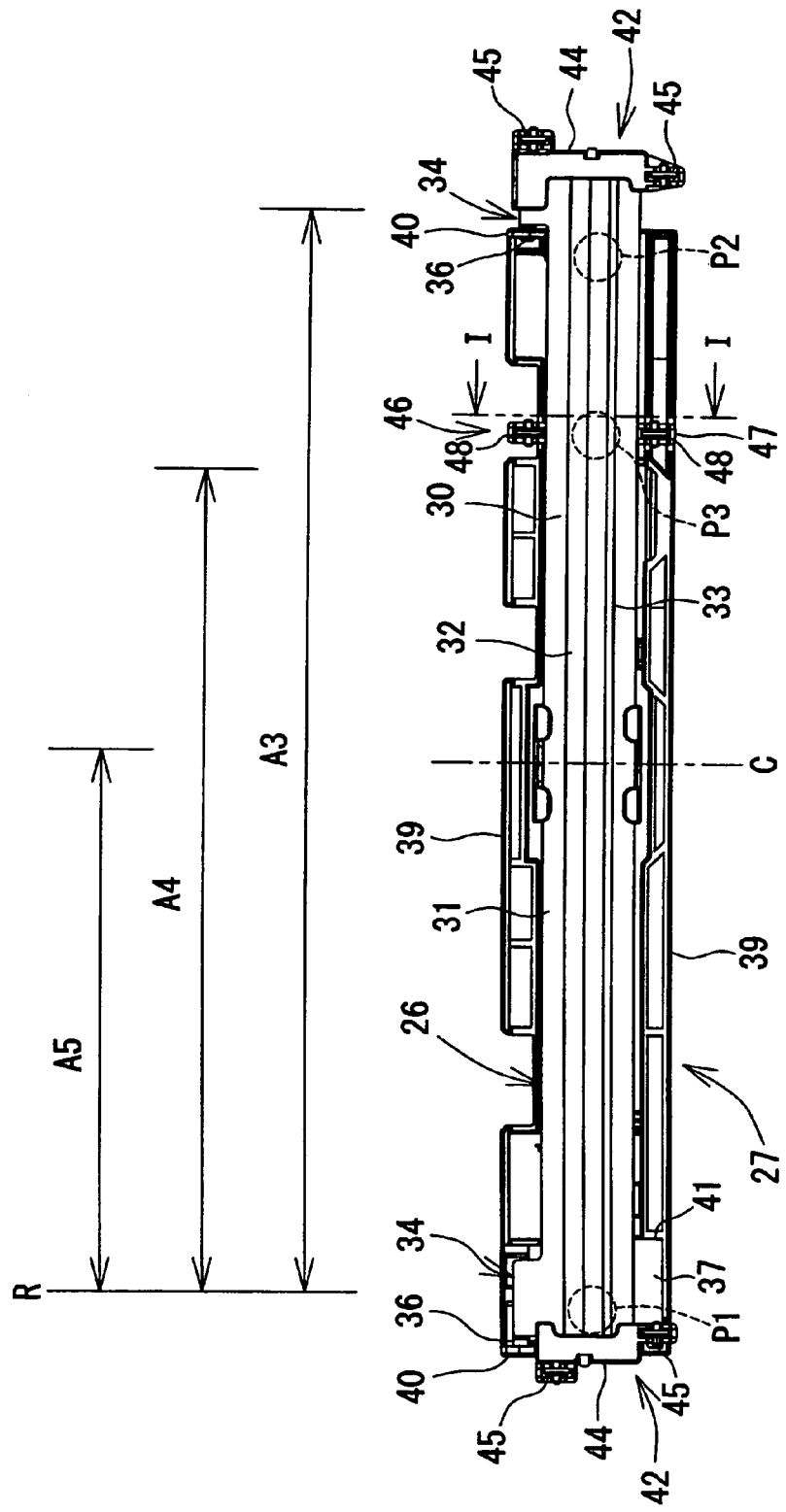
FIG. 6 is a plan view showing a carriage 27 on which the CIS 26 is mounted.

FIG. 6 is a plan view showing the carriage 27 on which the CIS 26 is mounted. As shown in FIG. 6, the carriage 27 is a container for housing the CIS-26 on its upper side. The carriage 27 comprises a bottom part 38 (refer to FIG. 7) and walls 39 provided upward from both ends of the bottom part 38 in the sub-scanning direction. The wall 39 forms a side surface of the carriage 27 in the reciprocating direction thereof. The CIS 26 is housed in a space formed by the bottom part 38 and the walls 39. A wall is not provided on both ends of the bottom part 38 in the main scanning direction, and one end of the casing 31 of the CIS 26 in the longitudinal direction is projected from one end of the carriage 27 in the longitudinal direction. The upper end of the carriage 27 is open and the upper surface 30 of the CIS 26 mounted on the carriage 27 is exposed.

The pedestals 40 to be engaged with the engagement parts 34 of the CIS 26 are provided on one of the walls 39. The pedestals 40 are long holes in a vertical direction and when the shafts 36 of the engagement parts 34 are inserted into the long holes respectively, the engagement parts 34 and the pedestals 40 are engaged with each other respectively so as to be movable in the vertical direction within a predetermined range. Each of the pedestals 40 is arranged at each position corresponding to the pair of engagement parts 34. The recess 41 is formed on the side of the inner surface of the other wall 39 so as to correspond to the projection 37. When the recess 41 and the projection 37 of the CIS 26 are engaged with each other, the CIS 26 can be positioned with respect to the carriage 27 in the main scanning direction.

In addition, although the CIS 26 is positioned by the engagement parts 34 provided in the casing 31 in the sub-scanning direction and by the projection 37 in the main scanning direction in this embodiment, those are one example to position the CIS 26 with respect to the carriage 27 and their configurations or positioning directions and the like can be changed.

Roller units 42 (positioning member) are provided at both ends of the CIS 26 in the longitudinal direction. As shown in FIG. 5, holes 43 for positioning the roller units 42 are formed at both ends of the upper surface 30 of the CIS 26. When pins projected from the bottom surface of each roller unit 42 are inserted into the holes 43, the roller units 42 are positioned and fixed to the both ends of the CIS 26 as shown in FIG. 6. Each roller unit 42 is constructed such that a pair of rollers 45 are supported by a frame 44 so as to roll in the direction of the shorter side of the CIS 26. Each roller 45 is uniformly-projected upward from the upper surface 30 of the CIS 26 so as to be in contact with the back surface of the platen glass 20, so that the distance between the upper surface 30 of the CIS 26 and the back surface of the platen glass 20 can be kept constant. This constant distance is provided such that the CIS 26 focuses on the upper surface of the platen glass 20. That is, the rollers 45 of each roller unit 42 are projected upward from the upper surface 30 such that the focal distance of the CIS 26 may accord with the distance to the upper surface of the platen glass 20. In addition, as each roller 45 rolls, the CIS 26 can be moved smoothly with respect to the platen glass 20.

Furthermore, a roller unit 46 (positioning member) is provided in the vicinity of the center of the CIS 26. Here, the vicinity of the center of the CIS 26 includes not only the center of the casing 31 in the longitudinal direction but also a predetermined region around the center. The predetermined region in the vicinity of the center is appropriately set. In other words, it is appropriately set except for the both ends of the CIS 26. Furthermore, in other words, the roller unit 46 of the CIS 26 is arranged at a predetermined position in the reading line of the CIS 26. The arrangement of the roller unit 46 will be described below.

Figure 7:
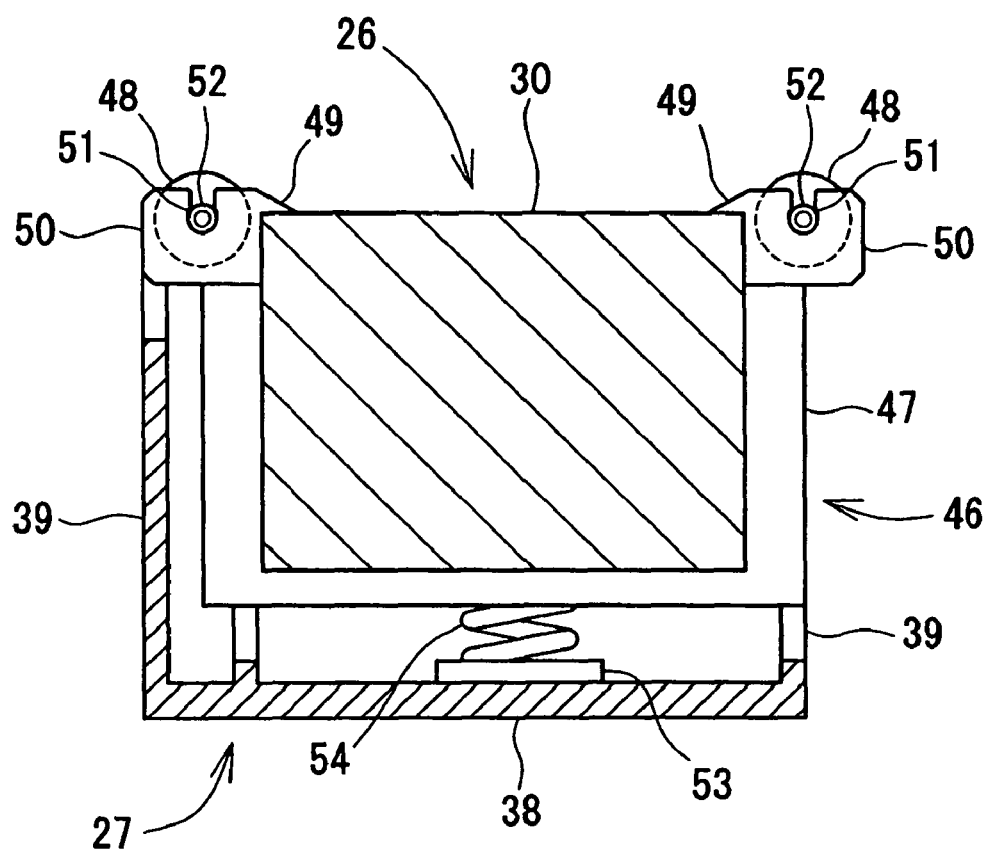
FIG. 7 is a sectional view taken along line I-I in FIG. 6.

FIG. 7 is a sectional view taken along line I-I of FIG. 6. As shown in FIG. 7, the roller unit 46 is constructed such that a pair of rollers 48 are supported by a frame 47 so as to roll in the direction of the shorter side (horizontal direction in FIG. 7) of the CIS 26. The frame 47 is formed in the shape of U such that the upper surface 30 of the CIS 26 is open and the side and bottom surfaces of the CIS 26 are surrounded. As described above, the light guide 32 and the condenser lenses 33 (refer to FIG. 6) are exposed in the upper surface 30 and the roller unit 46 is arranged within the reading line. If the frame 47 is placed on the upper surface 30 of the CIS 26 like the frame 44 of the roller unit 42, the upper side of the light guide 32 and the condenser lens 33 are covered in the reading line, so that the light emitted from the light guide 32 of the CIS 26 is interrupted at the covered region and the reflected light is not applied to the condenser lens 33. Therefore, the frame 47 of the roller unit 46 is mounted on the CIS 26 such that the upper surface 30 of the CIS 26 is open.

A latch click 49 is projected inward at the upper end of the frame 47. When the latch click 49 latches with the upper surface 30 of the CIS 26, the frame 47 is fixed to the CIS 26. In addition, the latch click 49 is projected so as not to cover the light guide 32 and the condenser lens 33 of the CIS 26.

A roller retainer 50 is provided at each upper end of the frame 47. Each roller retainer 50 is provided such that the roller 48 is housed between a pair of side plates opposed in the longitudinal direction of the CIS 26. A bearing 51 is formed at the side plate of each roller retainer 50. A shaft 52 of the roller 48 is supported by the bearing 51 such that it can roll.

Each roller 48 supported by the bearing 51 in the roller retainer 50 is uniformly projected upward from the upper surface 30 of the CIS 26. This projected width is equal to the projected width of the rollers 45 of each roller unit 42 projected from the upper surface of the CIS 26. When each roller 48 abuts on the back surface of the platen glass 20, the distance between the upper surface 30 of the CIS 26 and the back surface of the platen glass 20 can be kept constant. This constant distance allows the focal distance of the CIS 26 to accord with the distance to the upper surface of the platen glass 20. That is, like the rollers 45 of the roller units 42, the rollers 48 of the roller unit 46 are projected upward from the upper surface 30 such that the focal distance of the CIS 26 may accord with the distance to the upper surface of the platen glass 20. The roller units 42 and 46 slide with the CIS 26. The rollers 45 and 48 of the roller units 42 and 46 roll, respectively in the sliding movement. In addition, since the rollers 45 and 48 roll, the CIS 26 can be moved smoothly with respect to the platen glass 20.

A spring bearing 53 is formed on the inner surface side of the bottom part 38 of the carriage 27. A coil spring 54 is positioned by the spring bearing 53 and provided between the CIS 26 and the carriage 27. The CIS 26 mounted on the carriage 27 is forced toward the platen glass 20, that is, upward by the coil spring 54. Since the engagement parts 34 and the bearings 40 are engaged respectively such that they can be moved in the vertical direction within a predetermined range (refer to FIG. 6), the CIS 26 can be moved in the vertical direction with respect to the carriage 27 within a predetermined range. The rollers 45 and 48 of the roller units 42 and 46 projected from the upper surface 30 of the CIS 26 are pressed against the back surface of the platen glass 20 by the coil spring 54 (refer to FIG. 8), and the CIS 26 can be moved downward against the force of the coil spring 54. In addition, the coil spring 54 is one example of a forcing member according to this embodiment, so that it is needless to say that a well-known forcing member such as a plate spring can be used instead of the coil spring 54.

Figure 8:
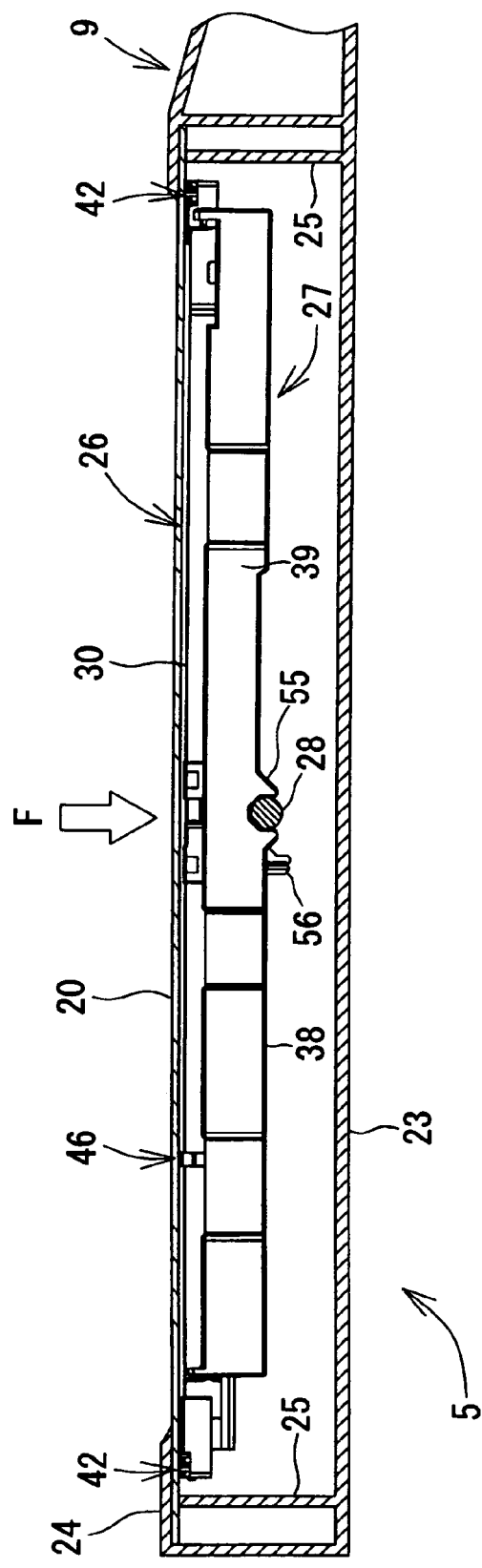
FIG. 8 is a side view showing the carriage 27 on which the CIS 26 is mounted.

FIG. 8 is a side view showing the carriage 27 on which the CIS 26 is mounted. In FIG. 8, a belt driving mechanism 29 is omitted. As shown in FIG. 8, the CIS 26 is mounted on the carriage 27 such that it is supported at the upper side of the carriage 27. On the lower surface of the carriage 27, a shaft bearing 55 is formed so as to sandwich the guide shaft 28 from the above. When the shaft bearing 55 and the guide shaft 28 are engaged, the carriage 27 is supported by the guide shaft 28 and the carriage 27 can slide in the axial direction of the guide shaft 28.

A belt grasper 56 is projected downward on the side of the shaft bearing 55. When the belt grasper 56 grasps a timing belt 59 of the belt driving mechanism 29, the timing belt 59 and the carriage 27 are connected. Thus, the driving force is transferred from the belt driving mechanism 29 to the carriage 27 and the carriage 27 is moved along the guide shaft 28.

Figure 9:
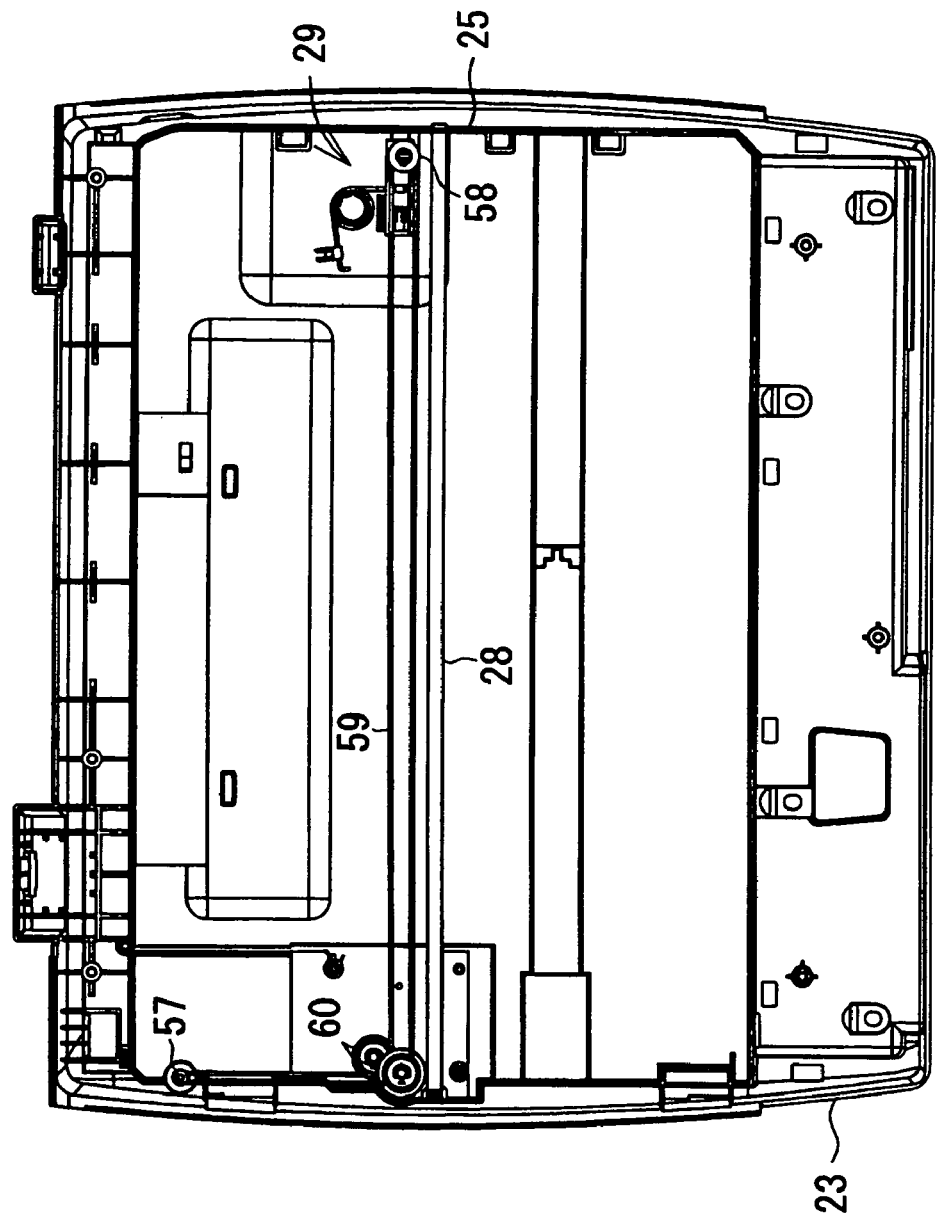
FIG. 9 is a plan view showing the constitution of a belt driving mechanism 29.

FIG. 9 is a plan view showing a state in which the CIS 26 and the carriage 27 are removed from FIG. 4. As shown in FIG. 9, the belt driving mechanism 29 is constituted such that the timing belt 59 is wound between a driving pulley 57 and a driven pulley 58. The timing belt 59 is an endless belt in which tooth are formed inside. The rotation of the motor is outputted to the shaft of the driving pulley 57. The timing belt 59 receives the rotation of the driving pulley 57 to move around. The driving pulley 57 is arranged on the left back of the lower frame 23. The timing belt 59 wound around the driving pulley 57 is extended toward the front side of the lower frame 23 and wound around a middle pulley 60 provided in front of the guide shaft 28 and bent at approximately right angles and extended to the right end of the lower frame 23 along the guide shaft 28 and wound around the driven pulley 58 provided in the vicinity of the right end, whereby the timing belt 59 is hung substantially in the shape of L. The part of the timing belt 59 from the driven pulley 58 to the middle pulley 60, that is, the part along the guide shaft 28 is grasped by the belt grasper 56 of the carriage 27. Thus, the timing belt 59 and the carriage 27 are connected. In addition, as the timing belt 59, other than the above endless belt, a belt having an end in which both ends of the belt is fixed to the carriage 27 can be used.

When the scanner unit 3 is used as the FBS, the document is placed on the platen glass 20 exposed on the upper surface of the housing 5. The CIS 26 provided in the housing 5 scans the document to read its image. The CIS 26 is mounted on the carriage 27 and the carriage 27 receives the driving force of the belt driving mechanism 29 and they are moved parallel with the platen glass 20. That is, the CIS 26 is moved parallel with the platen glass 20 together with the carriage 27. The CIS 26 mounted on the carriage 27 is forced toward the platen glass 20 by the coil spring 54. The CIS 26 comprises the roller units 42 and 46 and the rollers 45 and 48 of the roller units 42 and 46 abut on the back surface of the platen glass 20 by the force of the coil spring 54. Thus, the distance between the platen glass 20 and the CIS 26 is kept constant. The CIS 26 reads the image of the document placed on the platen glass 20 along the reading line in the main scanning direction and slid in the sub-scanning direction. As described above, since the distance between the CIS 26 and the platen glass 20 is kept constant, the CIS 26 can implement satisfactory image reading over the whole region of the platen glass 20.

The arrangement of the roller units 42 and 46 and the coil spring 54 will be described hereinafter. As shown in FIG. 6, the roller units 42 are arranged at both ends of the CIS 26 in the longitudinal direction. The both ends of the CIS 26 at which the roller units 42 are arranged is a region in which the image reading by the CIS 26 is not performed. The reading line (in the horizontal direction in FIG. 6) of the CIS 26 corresponds to the maximum size of the document that the scanner unit 3 can read. According to this embodiment, the scanner unit 3 can read the document of A3 size or less. The document is placed based on one end of the platen glass 20. According to this embodiment, the document is placed on the platen glass 20 based on the back side of the device. This reference position R is shown in FIG. 6. In addition, widths of the documents of A3 size, A4 size and A5 size in the reading line are shown in FIG. 6.

As shown in FIG. 6, one of the roller units 42 is arranged outside the reference position R. The other roller unit 42 is arranged outside the position across the document width of A3 size in the reading line direction of the CIS 26 from the reference position R. That is, each roller unit 42 is positioned outside the reading region of the CIS 26.

The roller unit 46 is positioned outside the position across the document width of A4 size and inside the position across the document width of A3 size in the reading line of the CIS 26 from the reference position R. That is, the roller unit 46 is positioned inside the region in which the image reading is performed by the CIS 26 but outside the region in which the image reading of the A4 size document is performed.

As shown in FIG. 6, the coil springs 54 are arranged at positions P1, P2 and P3 between the CIS 26 and the carriage 27. The positions P1 and P2 correspond to the roller units 42. According to this embodiment, since the roller units 42 are positioned at both ends of the CIS 26 in the longitudinal direction, both ends of the CIS 26 are projected from both ends of the carriage 27 in the longitudinal direction, so that the positions P1 and P2 are arranged inside the roller units 42. In a case where both ends of the CIS 26 are housed in the carriage 27, the positions P1 and P2 may be just under the roller units 42. That is, as long as each of the coil springs 54 is provided so as to be paired with each of the roller units 42 and 46, it may be provided just under the roller unit 42 or shifted from that position to some extent. Thus, the force of each of the coil springs 54 is directly transmitted to each of the paired roller units 42 and 46.

As shown in FIG. 8, since the roller units 42 and 46 are in contact with the back surface of the platen glass 20 at three positions, that is, in the vicinity of both ends and central part with respect to the vicinity of the both ends (the vicinity of the center), of the CIS 26 in the reading line direction, the distance between the platen glass 20 and the CIS 26 is kept constant. The periphery of the platen glass 20 is supported by the supporting rib 25 of the lower frame 23. For example, when a book document is placed on the platen glass 20 to be read, in order to bring a part between pages of the book document close to the platen glass 20, the book document is pressed against the platen glass 20 in some cases. Thus, load F pressing downward is applied to the platen glass 20. Since the platen glass 20 is not supported by the supporting rib 25 in the vicinity of the center thereof, it is likely to be bent downward by the load F. However, since the roller unit 46 abuts on the platen glass 20 in the central part of the CIS 26 and the roller unit 46 is forced by the coil spring 54 arranged just under the roller unit 46, the platen glass 20 is supported by the roller unit 46 in the vicinity of the center. This supporting force prevents the platen glass 20 from being bent by the load F.

In addition, when the load F applied to the platen glass 20 is excessive as compared with the force of the coil spring 54, the CIS 26 is moved downward against the force of the coil spring 54. Thus, although the platen glass 20 is bent downward in the vicinity of the center, the CIS 26 is moved downward as the platen glass 20 is bent because of the roller unit 46, so that the bent platen glass 20 is not in contact with the CIS 26 directly. Thus, the light guide 32 and the condenser lens 33 of the CIS 26 are prevented from being damaged. In addition, the platen glass 20 bent toward the CIS 26 is directly in contact with the roller unit 42 provided in one of both ends of the CIS 26 and the roller unit 46 provided in the central part with respect to the both ends. Thus, since the excessive load F is applied not only to the roller unit 46 provided in the central part but also to one roller unit 42 that is in contact with the bent platen glass 20, the load F is prevented from concentrating on a specific portion of the CIS 26, so that the CIS 26 is prevented from being damaged.

As described above, the roller unit 46 provided in the central part is arranged outside the region in which the A4 document is read. The rollers 45 and 48 of the roller units 42 and 46 roll while being in contact with the platen glass 20. In order to make the rolling of the rollers 45 and 48 smooth, grease or the like is applied to the roller surfaces of the rollers 45 and 48 in some cases. Although the rollers 45 are positioned outside the image reading region of the CIS 26, the roller 48 is positioned in the image reading region of the CIS 26. Therefore, the grease or the like applied to the roller 48 could be attached on the back surface of the platen glass 20 and left as a track on which the roller 48 has rolled.

That track because of the grease or the like has no affect on the image reading of the CIS 26 in many cases. While the CIS 26 is positioned so as to focus on the surface of the platen glass 20, the grease or the like is attached on the back surface of the platen glass 20. Considering the focal depth of the CIS 26, the back surface of the platen glass 20 having a thickness of several millimeters is out of the focal depth of the CIS 26. In addition, the grease or the like is half-transparent. That is, even when the half-transparent grease or the like exists outside the focal depth of the CIS 26, the grease or the like rarely appears in the read image clearly. If a dust or the like is further attached on the track of the grease or the like and it affects the read image, since the roller unit 46 is arranged outside the image reading region of the A4 size document, the image reading of the A4 size document is not affected.

In addition, although the standard document size read by the scanner unit 3 is A4 size in this embodiment, a size other than the A4 size may be a standard document size. More specifically, the standard document may be A5 size. As shown in FIG. 6, the platen glass 20 is exposed from the upper surface of the housing 5 such that the A3 size document can be read. The document width of A5 size is a half of the document width of A3 size. Therefore, when the roller unit 46 is arranged outside a position across the A5 document width from the reference position R in the reading line direction of the CIS 26 a little, that is, outside the reading region of the A5 size document a little, the roller unit 46 can be arranged in the vicinity of the center C of the CIS 26 in the reading line direction, so that the roller units 42 and 46 can be arranged in a balanced manner in the reading line direction of the CIS 26.

In addition a coating may be provided on the back surface of the platen glass 20, that is, on the surface with which the roller unit 46 is in contact to reduce a friction. For example, the coating is provided by laminating a transparent resin having a low friction resistance on the back surface of the platen glass 20. Thus, since the roller 48 can roll smoothly along the platen glass 20, the smooth movement of the CIS 26 can be implemented without applying the grease or the like to the roller 48, and the track of the grease or the like is not left in the image reading region of the platen glass 20.

Figure 10:
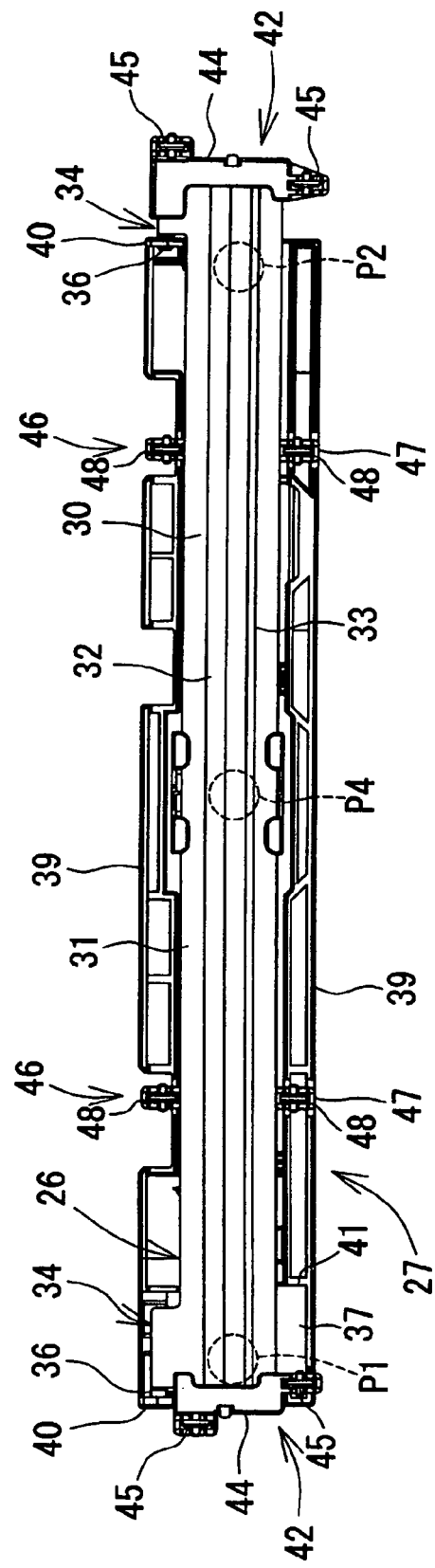
FIG. 10 is a plan view showing a CIS 26 and carriage 27 in which two roller units 46 are arranged.

In addition, although one roller unit 46 is arranged in the central part (the vicinity of the center) of the CIS 26 in this embodiment, two or more roller units 46 may be arranged in the central part of the CIS 26. For example, as shown in FIG. 10, the roller units 42 are arranged at both ends of the CIS 26 in the longitudinal direction, and two roller units 46 are arranged in the image reading region of the CIS 26. When the number of roller units 46 arranged between the roller units 42 at both ends of the CIS 26 is increased, a distance between the roller units 42 and 46 is shortened in the reading line direction. In this case, since the platen glass 20 is supported at four portions by the roller units 42 and 46 in the reading line direction of the CIS 26, the supporting force of the platen glass 20 is improved. Especially, when the distance of the CIS 26 in the reading line direction is long, the above is preferable because the effect to prevent the platen glass 20 from being bent is improved. In addition, since the load F applied to the platen glass 20 is dispersed to the four roller units 42 and 46, the force required to support the roller units 42 and 46 can be reduced.

When the two or more roller units 46 are provided in the central part of the CIS 26, the coil springs 54 provided between the CIS 26 and the carriage 27 may be arranged in the vicinity of the position just under the roller unit 42 or 46 so as to be paired with the roller units 42 and 46 like the above embodiment, or may be arranged almost at the center P4 between the two roller units 46 as shown in FIG. 10. When the coil spring 54 is arranged at the position P4, since the number of the coil springs 54 is three for the four roller units 42 and 46, the manufacturing cost can be reduced because the number of components is reduced and an assembling process is simplified.

In addition, although the positioning member is implemented with the roller units 42 and 46 in this embodiment, the positioning member is not limited to the above roller units 42 and 46 having the rollers 45 and 48. That is, the positioning member only has to keep the distance between the CIS 26 and the platen glass 20 constant. Therefore, it may be a projection protruding upward from the upper surface 30 of the CIS 26 instead of the roller units 42 and 46, for example.

Thus, according to the scanner unit 3 shown in this embodiment, since the roller units 42 and 46 for keeping the distance between the platen glass 20 and the CIS 26 constant are arranged at the three points in the vicinity of the both ends and the central part with respect to the vicinity of the both ends of the CIS 26 in the reading line direction, the rollers 45 and 48 of the roller units 42 and 46 are in contact with the platen glass 20 at the three points in the vicinity of both ends and the central part of the CIS 26 in the reading line direction to keep the distance between the platen glass 20 and the CIS 26 constant. Furthermore, since the platen glass 20 is supported by the roller unit 46 arranged in the central part of the CIS 26, even when the load F is applied to the vicinity of the center of the platen glass 20, the platen glass 20 is prevented from being bent by the load F. Thus, even when the load F is applied to the platen glass 20, the distance between the CIS 26 and the document can be kept constant. In addition, since the roller units 42 and 46 are projected uniformly upward from the upper surface 30 of the CIS 26 such that the CIS 26 can focus on the upper surface of the platen glass 20, the document is placed on the platen glass 20 so as to be focused by the CIS 26, so that high-precision image reading can be implemented.

Furthermore, even when the load F is too excessive to the force of the coil spring 54 and the platen glass 20 is bent, the platen glass 20 is not brought to be in contact with the CIS 26 directly and the excessive load F is not directly applied to a specific point of the CIS 26. As a result, the CIS 26 can be prevented from being damaged by the excessive load F.

According to this embodiment, the positioning member is moved parallel with the transparent board with the image sensor while abutting on the transparent board. When the grease or the like for reducing sliding resistance is applied to the positioning member, the track of the grease or the like could be left on the transparent board. In view of this, the positioning member in the central part of the image sensor is arranged outside the reading region of the document having the predetermined size, so that the track of the grease or the like does not affect the image reading of the document having the predetermined size.

According to this embodiment, since the A3 size document can be placed on the transparent board, the image reading of the A3 size document can be implemented. When the positioning member in the central part of the image sensor is arranged outside the reading region of the A5 size, the track of the grease or the like does not affect the image reading of the A5 size document. In addition, since approximately the center of the image sensor in the longitudinal direction is positioned outside the reading region of the A5 size document, the positioning member can be arranged approximately the center of the image sensor. Thus, the positioning member can be provided in a balanced manner in the image sensor in the longitudinal direction.

According to this embodiment, since the distance between the positioning members in the vicinity of the both ends and the central part with respect to the vicinity of the both ends of the image sensor is shortened, supporting force of the transparent board is improved.

According to this embodiment, since the force of the forcing member is transmitted to the paired positioning member, the supporting force of the transparent board is improved.

According to this embodiment, since the number of forcing members for the positioning members arranged in the central part of the image sensor can be reduced, the cost is reduced because the number of components is reduced and the assembling process can be simplified.

According to this embodiment, since the sliding of the positioning member along the transparent board becomes smooth, the image sensor can be smoothly moved.

According to this embodiment, since the sliding of the positioning member along the transparent board becomes smooth, the image sensor can be smoothly moved without using the grease or the like for the positioning member. Furthermore, the track of the grease or the like is not left on the transparent board.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds are therefore intended to be embraced by the claims.

What is claimed is:

1. An image reading device comprising:
a transparent board having a surface on which a document is placed;
a carriage provided on the side of the back surface of the transparent board so as to be movable parallel with the transparent board;
a linear image sensor mounted on the carriage in the direction perpendicular to the moving direction to perform an image reading operation for the document placed on the transparent board;
a plurality of positioning members provided on the image sensor in the vicinity of both ends of the image sensor in a longitudinal direction and on a part of the image sensor not in the vicinity of the ends, the plurality of positioning members projected so as to abut on the transparent board; and
a forcing member provided in the carriage to force the image sensor toward the transparent board,
wherein the positioning member arranged on the part of the image sensor not in the vicinity of the ends is arranged outside the reading region of a document having a predetermined size on the transparent board.

2. The image reading device according to claim 1, wherein the part of the image sensor not in the vicinity of the ends is in the vicinity of the center of the image sensor.

3. The image reading device according to claim 1, wherein the predetermined size of the document is A4 size.

4. The image reading device according to claim 1, wherein the transparent board has a size in which a A3 size document can be read,
the positioning member arranged in the part of the image sensor not in the vicinity of the ends is arranged outside the reading region of a A5 size document on the transparent board.

5. The image reading device according to claim 1, wherein the number of the positioning member arranged in the part of the image sensor not in the vicinity of the ends is two or more.

6. The image reading device according to claim 5, wherein the forcing member is arranged between the positioning members arranged in the part of the image sensor not in the vicinity of the ends.

7. The image reading device according to claim 1, wherein the forcing members are arranged so as to be paired with each of the positioning members respectively.

8. The image reading device according to claim 1, wherein each of the positioning members has a roller that is in contact with the transparent board and rolls in the moving direction of the image sensor.

9. The image reading device according to claim 1, wherein a coating for reducing a friction is provided on the surface of the transparent board with which the positioning member is in contact.

10. An image reading device comprising:
a transparent board having a surface on which a document is placed;
a carriage provided on the side of the back surface of the transparent board so as to be movable parallel with the transparent board;
a linear image sensor mounted on the carriage in the direction perpendicular to the moving direction to perform an image reading operation for the document placed on the transparent board;
a plurality of positioning members provided on the image sensor in the vicinity of both ends of the image sensor in a longitudinal direction and on a part of the image sensor not in the vicinity of the ends, the plurality of positioning members projected so as to abut on the transparent board; and
a forcing member provided in the carriage to force the image sensor toward the transparent board.

* * * * *